United States Patent
Chao (10) Patent No.: US 7,661,111 B2
(45) Date of Patent: Feb. 9, 2010

(54) METHOD FOR ASSURING EVENT RECORD INTEGRITY

(75) Inventor: Ching-Yun Chao, Austin, TX (US)

(73) Assignee: Inernational Business Machines Corporation, Armonk, NY (US)

( * ) Notice: Subject to any disclaimer, the term of this patent is extended or adjusted under 35 U.S.C. 154(b) by 845 days.

(21) Appl. No.: 11/249,931

(22) Filed: Oct. 13, 2005

(65) Prior Publication Data

US 2007/0089116 A1 Apr. 19, 2007

(51) Int. Cl.
G06F 9/54 (2006.01)
G06F 9/46 (2006.01)
(52) U.S. Cl. .................... 719/318; 709/218
(58) Field of Classification Search ............. 719/318, 719/218
See application file for complete search history.

(56) References Cited

U.S. PATENT DOCUMENTS 6,658,568 B1 12/2003 Ginter et al.
2002/0016867 A1* 2/2002 Kampe et al. ........... 709/318
2002/0166052 A1* 11/2002 Garg et al. ............... 713/182
2003/0191953 A1 10/2003 Pandit et al.

FOREIGN PATENT DOCUMENTS

WO WO0214988 A2 2/2002

* cited by examiner

Primary Examiner—Hyung S Sough
Assistant Examiner—Abdou K Seye
(74) Attorney, Agent, or Firm—Justin Dillon; The Brevetto Law Group; Scott Charles Richardson (57) ABSTRACT

A method for assuring event record integrity including registering at least one callback function, the callback function being associated with a first callback function identifier, receiving an event having a second callback function identifier, identifying the callback function based on matching the second callback function identifier to the first callback function identifier, and calling the identified registered callback function to validate authenticity of the event.

15 Claims, 7 Drawing Sheets

METHOD FOR ASSURING EVENT RECORD INTEGRITY

FIELD OF INVENTION

The present invention relates generally to the generation of audit event records in a data processing system, and more specifically, to assuring event record integrity.

BACKGROUND OF THE INVENTION

Daily transactions on data processing systems number in the millions. Still, some people and businesses hesitate to use such transactions because of security concerns. Many organizations, such as government, banking, finance, and pharmaceuticals, are concerned with security. Organizations are concerned with the need to assure that no tampering occurs with any event and that the event is from a trusted source. Of particular concern is the security of business transaction records and security of audit records tracking those business transaction records. Without audit records, the business transactions may be subject to unauthorized transactions, including intrusions, falsification, tampering, and potential threats. Lack of audit records can also result in an inability to prove accountability and assure non-repudiation. Systems which lack security invite attack.

Audit event records must accurately reflect the event history for applications and identify the event author, i.e., authenticate the event. Some audit event records are generated from trusted server code, while others are generated by untrusted application logic. For example, in any J2EE application server runtime environment, application logic may run in the same address space as trusted server code. Failure to secure audit event records jeopardizes transaction integrity and accountability. The modern application server computing environment allows hosting of multiple applications. Applications share a common event infrastructure and auditing infrastructure which must provide the capability to authenticate each individual application as the event source. The infrastructure must prevent one application from impersonating another application's identity in event records.

One approach to assuring event record integrity has been to encrypt transaction records and send a digital signature with the transaction records. This process is cumbersome, not only because of the need to transmit extra files, but because of retention requirements for auditability. Certain transaction records, such as military and financial records, and their associated keys, must be retained and accessible for fifteen years. Moreover, the key management capability must scale with the number of applications. Each application should be given its own cryptographic keys in order to ensure isolation of application event records.

It would be desirable to have a method for assuring event record integrity that overcomes the above disadvantages.

SUMMARY OF THE INVENTION

One aspect of the present invention provides a method in a data processing system for trusted application event auditing including registering at least one callback function, the callback function being associated with a first callback function identifier; receiving an event having a second callback function identifier; identifying the callback function based on matching the second callback function identifier to the first callback function identifier; and calling the identified registered callback function to validate authenticity of the event.

Another aspect of the present invention provides a method in a data processing system for trusted application event auditing including registering with an event infrastructure an event factory implementation and an event factory implementation identifier associated with the event factory implementation, generating an event having an event identifier at the event factory implementation, storing the event identifier in a cache at the event factory implementation, sending the event including the event factory implementation identifier and the event identifier to an event receiver, receiving a call at a callback function associated with the event factory implementation based on the event factory implementation identifier, and validating event authenticity at the callback function based on the event identifier.

Another aspect of the present invention provides a computer readable medium storing a computer program executable by a digital processing apparatus to perform operations to audit trusted application events in a data processing system, the operations including registering at least one callback function, the callback function being associated with a first callback function identifier; receiving an event having a second callback function identifier; identifying the callback function based on matching the second callback function identifier to the first callback function identifier; and calling the identified registered callback function to validate authenticity of the event.

Another aspect of the present invention provides a system for trusted application event auditing in a data processing system including means for registering at least one callback function, the callback function being associated with a first callback function identifier; means for receiving an event having a second callback function identifier; means for identifying the callback function based on matching the second callback function identifier to the first callback function identifier; and means for calling the identified registered callback function to validate authenticity of the event.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
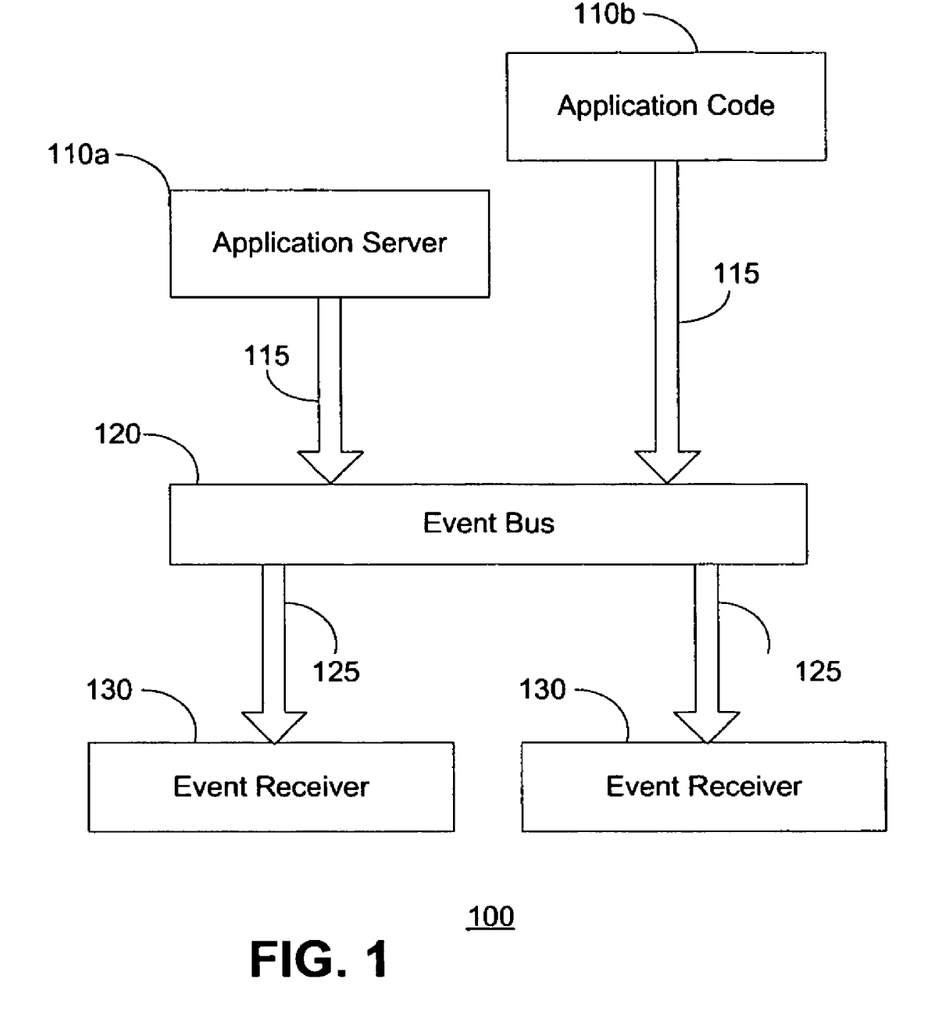
FIG. 1 is a block diagram of a data processing system employing trusted application event auditing in accordance with the present invention.

FIG. 1 is a block diagram of a data processing system employing trusted application event auditing in accordance with the present invention. The system 100 includes at least one application server 110a and/or application code 110b, at least one event bus 120, and at least one event receiver 130. The application server 110a and application code 110b are event senders that produce events 115, which enter the event bus 120. In one embodiment, the event senders 110a and 110b are known or trusted sources. The event receivers 130 collect received events 125 from the event bus 120. One example of an application server is the IBM WebSphere Application Server, available from IBM Corporation of Somers, N.Y. One example of application code is the IBM Tivoli Identity Manager, available from IBM Corporation of Somers, N.Y., which can be used for user account management, password management, profile information management, provision rule management, and the like.

The system 100 is also referred to as an event infrastructure herein. The event infrastructure typically includes one or more event senders, one or more event buses, and one or more event receivers. The event infrastructure may also include application program interfaces (APIs) for event generation and authentication, event storage, event auditing mechanisms, and the like. Those skilled in the art will appreciate that the system 100 can be designed according to the particular use desired.

Figure 2:
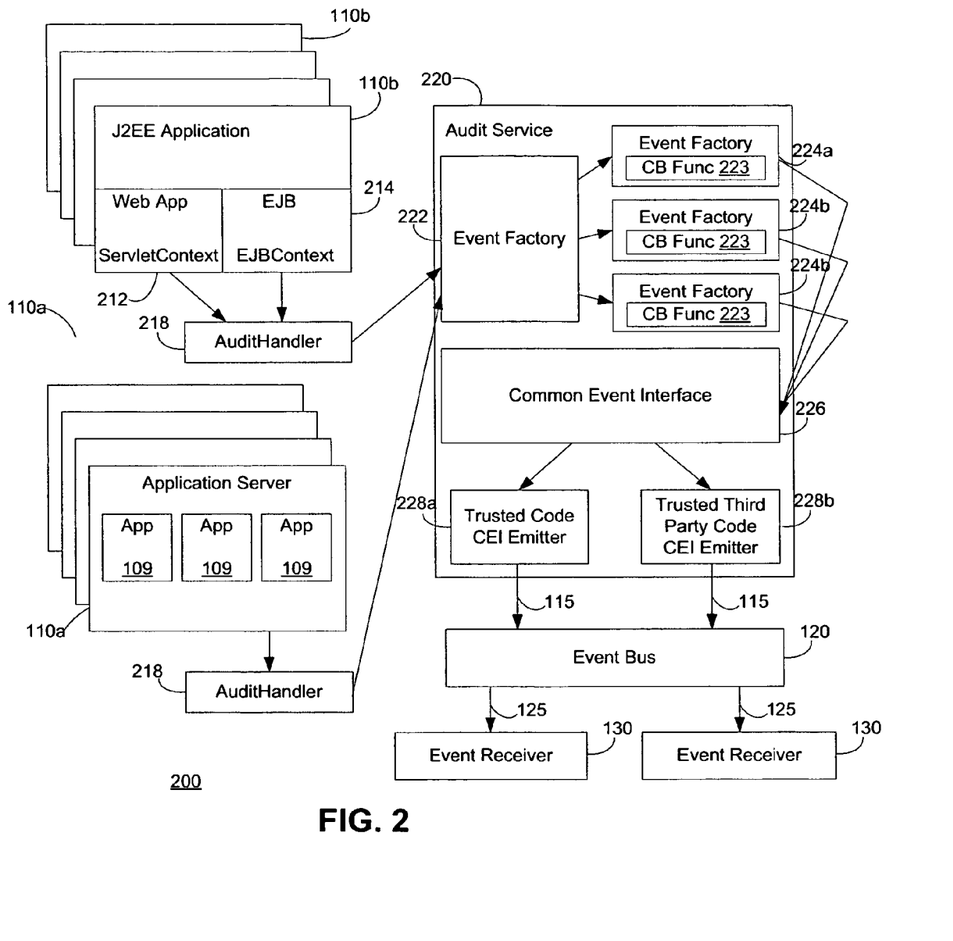
FIG. 2 is a block diagram of a security auditing system for trusted application event auditing in accordance with the present invention.

FIG. 2, in which like elements share like reference numbers with FIG. 1, is a block diagram of a security auditing system 200 for trusted application event auditing in accordance with the present invention. The event infrastructure may include a number of application servers 110a and/or a number of application codes 110b. Application code 110b, such as a J2EE application, includes one or more web applications with associated servlet contexts 212 and one or more Enterprise Java Beans (EJB) with associated EJB contexts 214. One or more audit handlers 218 are associated with the application code 110b. One or more audit handlers 218 may also be associated with the application server 110a. Multiple applications 109 may be installed for each application server 110a. The applications 109 may be any application suitable for running on a server, such as an application based on application code 110b like the exemplary Tivoli Identity Manager, user supplied code, vendor supplied code, or the like. More than one security auditing system 200 may exist on a computer or in a server system or network. Each security auditing system may include an application server 110a, and one or more application code 110b.

The audit handlers 218 create events and communicate with audit service 220. The audit service 220 includes an event factory 222, event factory implementations 224a, 224b, common event interface (CEI) 226, and CEI emitters 228a, 228b. The event factory 222 includes functions to facilitate the submission of events to the event infrastructure. The event factory implementation 224a is an event factory implementation for application server 110a and the event factory implementations 224b are event factory implementations for application code 110b. In one embodiment, only registered event factory implementations may submit events to the event infrastructure. The event factory implementations 224a, 224b provide further functions to customize the submission of events. In one embodiment, submission of an event may use both the event factory 222 and an event factory implementation 224a, 224b to provide all the necessary functions and instructions. The event factory implementations 224a, 224b may be generated from trusted code or from third party code that is trusted by the platform, respectively. In one embodiment, all event factory implementations must be trusted by the event infrastructure. In order to achieve trusted status, an event factory implementation must be registered with the event infrastructure. In one embodiment, registration requires administrative role authorization, such as registration by an authorized administrative user.

Events generated by event factory 222 and event factory implementations 224a, 224b may pass into a common event interface (CEI) 226. The CEI 226 passes events to the event bus 120 using a CEI emitter, such as a trusted code CEI emitter 228a or a trusted third party code CEI emitter 228b.

Various processes and functions may be held within, managed, or performed by the event factory 222 and/or the event factory implementations 224a, 224b. For example, one function that may be performed by the event factory implementation is a filtering process before or during event creation. An event may include event factors, such as an event type, an auditability class, and/or outcome value, such as a success or failure outcome for the event. Based on these event factors, the event factory implementation may filter the event and selectively continue the process of creating the event. Another function is filling in event information in the event—the event factory 222 may fill in event information such as source identification, user security information, context sensitive information, and the like. The event factory 222 may also pass the produced event to the event bus 120. In one embodiment, the event factory 222 may not send the event to its event sender, but may return the unique event identifier (UEID) of the produced event. The event sender may then use the returned UEID to retrieve events from the event infrastructure. The events are secure as the events are generated by the registered, trusted code of the event factory 222, and the event is not visible to or editable by the event sender before submission to the event bus. Those skilled in the art will appreciate that functions described herein in connection with one of the event factory 222 or the event factory implementations 224a, 224b can equally be connected with the other of the event factory 222 or the event factory implementations 224a, 224b.

Events may be further secured by requiring each event sender, application server 110a, and application code 110b to register with the event infrastructure, associating the event sender with an event factory implementation prior to allowing event generation. In one embodiment, registration requires administrative role authorization, such as registration by an authorized administrative user. Components and applications using the event infrastructure may develop their own event factory implementation. Multiple components and applications may share an event factory implementation. Typically, event factories add authentication information to event records to indicate the source of the event. The authentication data may include, but is not limited to, the identity of the application, the server, and identity of the users. The event receiver 130 may also be required to register with the event infrastructure, associating the event receiver with an event factory implementation prior to allowing event reception. In one embodiment, each event receiver 130 may be registered with the event infrastructure with a unique event receiver identifier associated with the event receiver, and may satisfy any authorization required for the registration. In one embodiment, some or all of the registrations require administrative role authorization, such as registration by an authorized administrative user.

Figure 3:
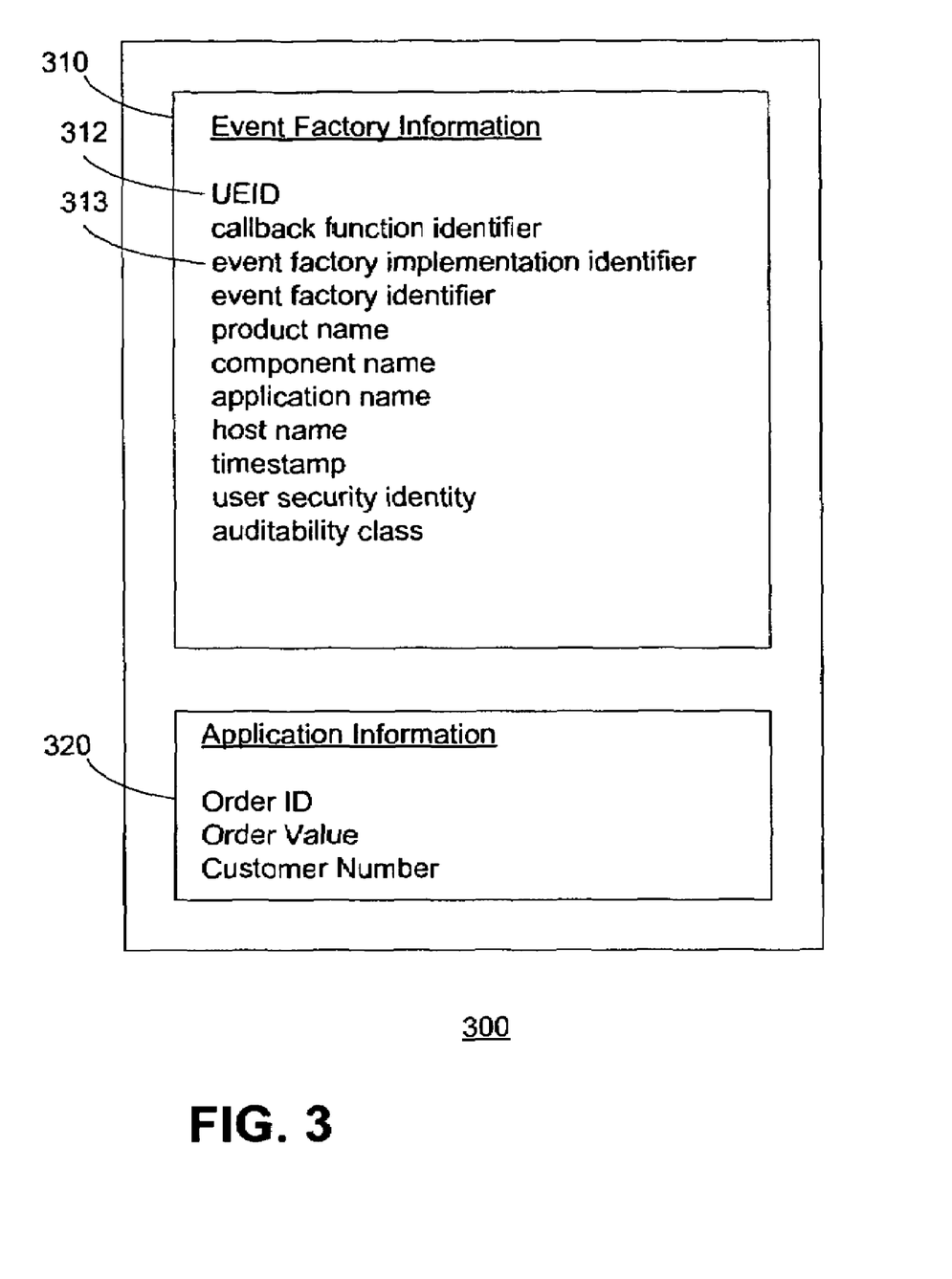
FIG. 3 is a block diagram of an exemplary event for trusted application event auditing in accordance with the present invention.

FIG. 3 is a block diagram of an exemplary event 300 for trusted application event auditing in accordance with the present invention. The exemplary event 300 includes event factory information 310 which may be added to the event 300 by an event factory 222, and optional application information 320 which may be added to the event 300 by event factory implementation. The exemplary event 300 is generated by trusted code. Examples of the event factory information 310 include unique event identifier (UEID) 312, callback function identifier, event factory implementation identifier 313, event factory identifier, product name, component name, application name, host name, timestamp, user security identity, auditability class, and/or other context sensitive information as desired. When event factory implementations are registered with the event infrastructure, the UEID 312 and the event factory implementation identifier 313 may uniquely identify an event across the event infrastructure. The auditability class may be used to filter events and determine whether authentication is required.

Applications and components, which are also referred to as event senders, send events via registered event factory implementations. In one embodiment, an event sender may receive a returned instance of an event from the event factory. In another embodiment, the event sender may receive a returned pointer to an event, such as a UEID for the event, from the event factory.

Examples of the optional application information 320 include order identifiers, order values, customer numbers, or the like. Optional application information may be provided by the event sender and added to the event 300 by the event factory implementation, such as an application specific event factory implementation. Those skilled in the art will appreciate that the event factory information 310 and the optional application information 320 may be any information suitable to the particular use desired.

Figure 4:
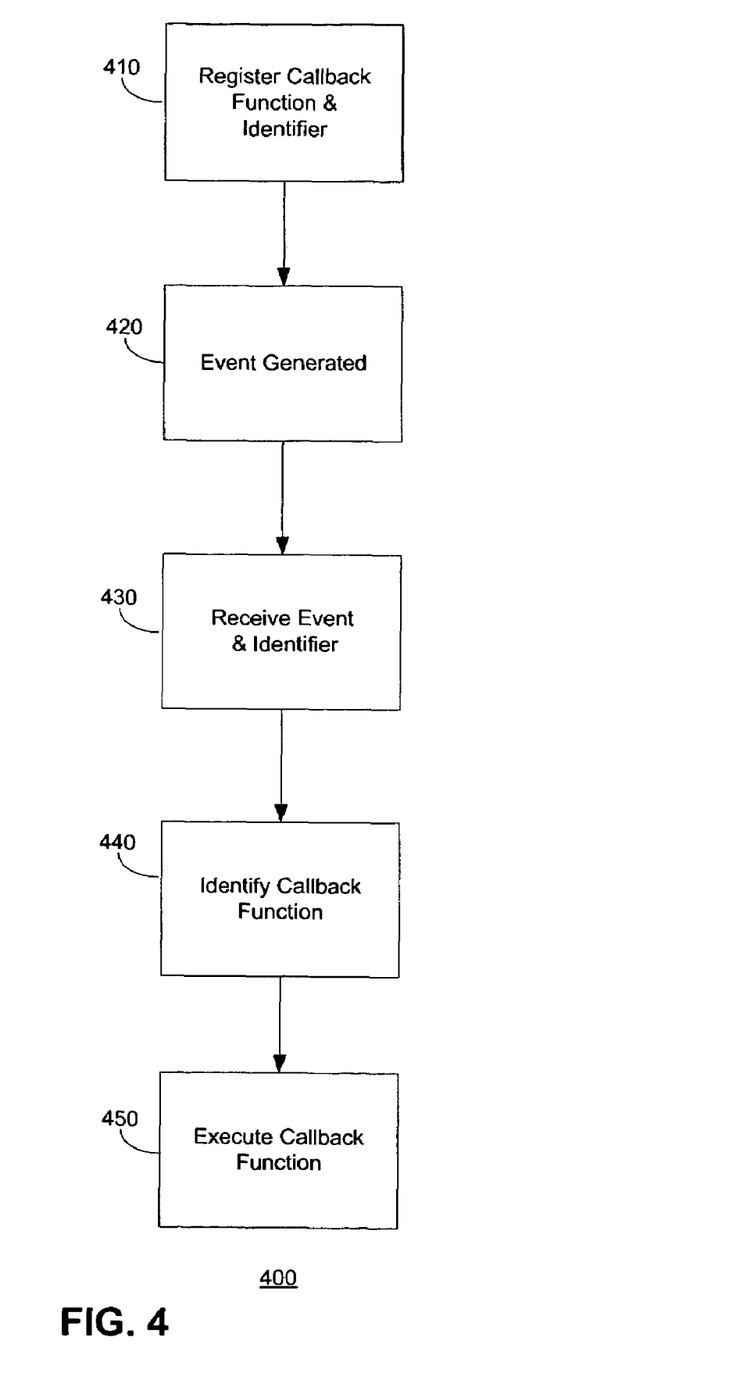
FIG. 4 is a flowchart of a method for generating trusted audit event records in accordance with the present invention.

FIG. 4 is a flowchart of a method for generating trusted audit event records in accordance with the present invention. Any of the inventive methods disclosed herein may be performed in any order, and the order in which the method is described does not limit the order in which the method can be performed. The method 400 includes registering a callback function including a callback function identifier at 410, generating an event at 420, receiving the event including a callback function identifier at 430, identifying the callback function at 440, and executing the callback function at 450.

At 410, a callback function including a first callback function identifier associated with the callback function is registered with the event infrastructure. The event sender can be an application including trusted or untrusted code, however, the callback function is trusted code. Only authorized administrative users are allowed to register callback functions. In one embodiment, the callback function and the first callback function identifier are registered with the event receiver. In one embodiment, the callback function and the first callback function identifier are associated with the event sender based on a registration within the event infrastructure. In one embodiment, a number of callback functions are registered with each of the callback functions being associated with a callback function identifier. The registered callback function may be in the event sender, the event factory implementation, or another program.

The callback function identifier may be any identifier suitable for identifying the callback function. In one embodiment, the callback function identifier is an alphanumeric identifier. In another embodiment, the callback function identifier is an identifier of a component associated with the callback function, such as an event factory, event factory implementation, or the like. In another embodiment, the callback function identifier is separate pieces of information that can be combined to identify the callback function, such as the name of a component generating an event and the name of the component that requests the event be generated. The callback function identifier is typically unique to any one event infrastructure. Those skilled in the art will appreciate that many types of callback function identifiers are possible depending on the particular use desired.

The event sender generates an event at 420 using an event factory. At 430, an event receiver receives the event including a second callback function identifier. In one embodiment, an event receiver is also registered and the event receiver associated with the callback function based on the registering. The receiving at 430 may then include receiving the event at the event receiver. In another embodiment, an application is also registered and the application associated with the callback function based on the registering. The receiving at 430 may then include receiving the event generated by the application.

The event receiver matches the first and second callback function identifiers to identify the callback function at 440. In one embodiment, the first and second callback function identifiers may be the same identifier. In one embodiment, the callback function and the first callback function identifier are associated with the event receiver based on a registration within the event infrastructure. At 450, the event receiver calls the identified registered callback function to validate the authenticity of the event. In one embodiment, the received event includes an event identifier, which may be used in the call to the callback function. In one embodiment, the event receiver generates a second event in response to the calling of the identified registered callback function.

The callback function verifies that the specific event was generated by a trusted source. A received event may include information indicating which event factory implementation generated the received event. An event receiver may use the callback function to verify whether the received event is from a trusted event factory implementation. This is useful should a malicious user compromise event bus security and submit false events directly to the event bus. When an event carries an event factory implementation identifier, the event receiver looks up the sending event factory implementation from the event infrastructure based on this identifier. The event receiver then invokes the callback function. For events submitted directly to the event bus, such as events submitted by the malicious user, the callback function indicates that the received event is not authentic, because the trusted event factory did not generate these events.

Figure 5:
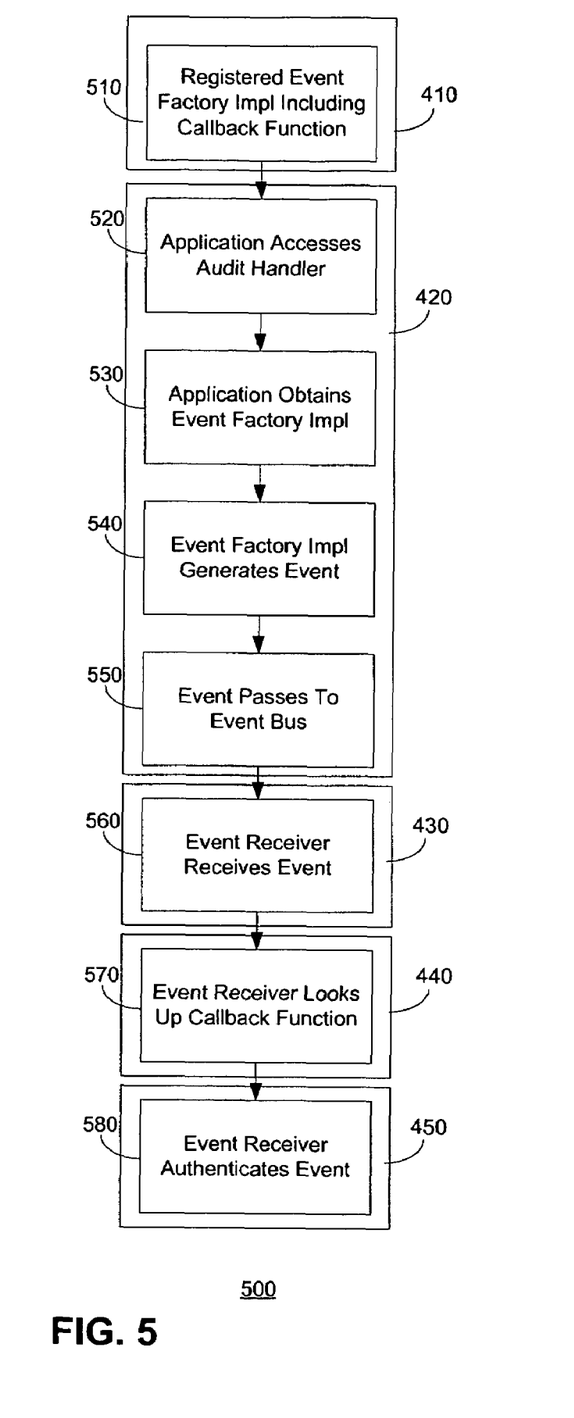
FIG. 5 is a flowchart of another embodiment of a method for generating trusted audit event records in accordance with the present invention.

FIG. 5, in which like elements share like reference numbers with FIG. 4, is a flowchart of another embodiment of a method for generating trusted audit event records in accordance with the present invention. Method 500 includes registering an event factory implementation including a callback function at 510, an application accessing its audit handler at 520, the application obtaining the registered event factory implementation at 530, the event factory implementation generating an event at 540, passing the event to an event bus at 550, an event receiver receiving the event at 560, the event receiver optionally looking up the callback function at 570, and the event receiver authenticating the event at 580.

Method 500 begins at 510 with registering an event factory implementation including a callback function, which is a function that authenticates that the registered event factory implementation generated a particular event. One example of a callback function accepts a UEID as an argument. The event factory is registered before an associated application can access the event infrastructure. The associated application may also require registration. In one embodiment, registration may require administrative role authorization, such as registration by an authorized administrative user, or another method of authorization.

In one embodiment, the event factory implementation registration process includes passing an event factory implementation identifier to the event infrastructure. For example, an event factory implementation name, a number, or the like. The event infrastructure then stores this event factory implementation identifier in association with the registered event factory implementation and callback function. Events generated by the registered event factory implementation may include the same event factory implementation identifier in subsequent event submissions in order to identify the event source. Alternatively, the event infrastructure may provide the event factory implementation with the event factory implementation identifier as part of the registration process. By way of another example, the event factory implementation may pass an event factory implementation identifier during the registration process, but then receive a second event factory implementation identifier for inclusion in subsequently generated events.

The event factory implementation identifier may be any identifier suitable for identifying the event factory implementation. In one embodiment, the event factory implementation identifier is an alphanumeric identifier. In another embodiment, the event factory implementation identifier is an identifier of a component associated with the event factory implementation, such as an event factory, callback function, or the like. In another embodiment, the event factory implementation identifier is separate pieces of information that can be combined to identify the event factory implementation, such as the name of a component generating an event and the name of the component that requests the event be generated. The event factory implementation identifier is typically unique to any one event infrastructure. Those skilled in the art will appreciate that many types of event factory implementation identifiers are possible depending on the particular use desired.

The application accesses its audit handler at 520, which obtains the registered event factory implementation at 530. The registered event factory implementation is trusted code and is a part of the event infrastructure. As such, the event factory implementation generates an event within the event infrastructure at 540. Upon receiving an event production request, the event passes to an event bus at 550. In one embodiment, the event is passed by way of a CEI emitter. In one embodiment, the event factory implementation may provide an event filter to determine whether an event should be generated, passed to the event bus, authenticated, or audited based on specified event type, outcome status, or other criterion. In one example, a public web resource may be accessed successfully from an application server. The event type may indicate a resource access request. The outcome status may provide information indicating the success the resource access request based on security policy and configuration. Other information may include the user identity associated with the access request. In the case of a publicly available web resource, there may be no associated user identity. The event filter may include one or more rules that determine not to pass on an event including a successful resource access request outcome status, and no user identity. A failed resource access request may continue processing and be passed to the event bus as desired.

An event receiver may then receive the event at 560. At 570, the event receiver may optionally look up the callback function associated with the event to check the authenticity of the event upon receipt of the event. In one embodiment, the event receiver performs a lookup on registered functions based on event source information stored within the event. For example, the event source information may include the event factory implementation identifier and the event receiver may access the event factory implementation and its associated callback function based on the event factory implementation identifier. At 580, the event receiver authenticates the event. The event receiver may execute the callback function in order to authenticate the event. Those skilled in the art will appreciate that other methods may and can be used with the callback mechanism to validate the authenticity of the events. In one embodiment, the event factory may send the application identity, event factory implementation identity, and credential data, which may be validated by an authentication and authorization subsystem of the event receiver. In another embodiment, the event factory may encrypt and/or sign the event, which can be validated by the event receiver.

Figure 6:
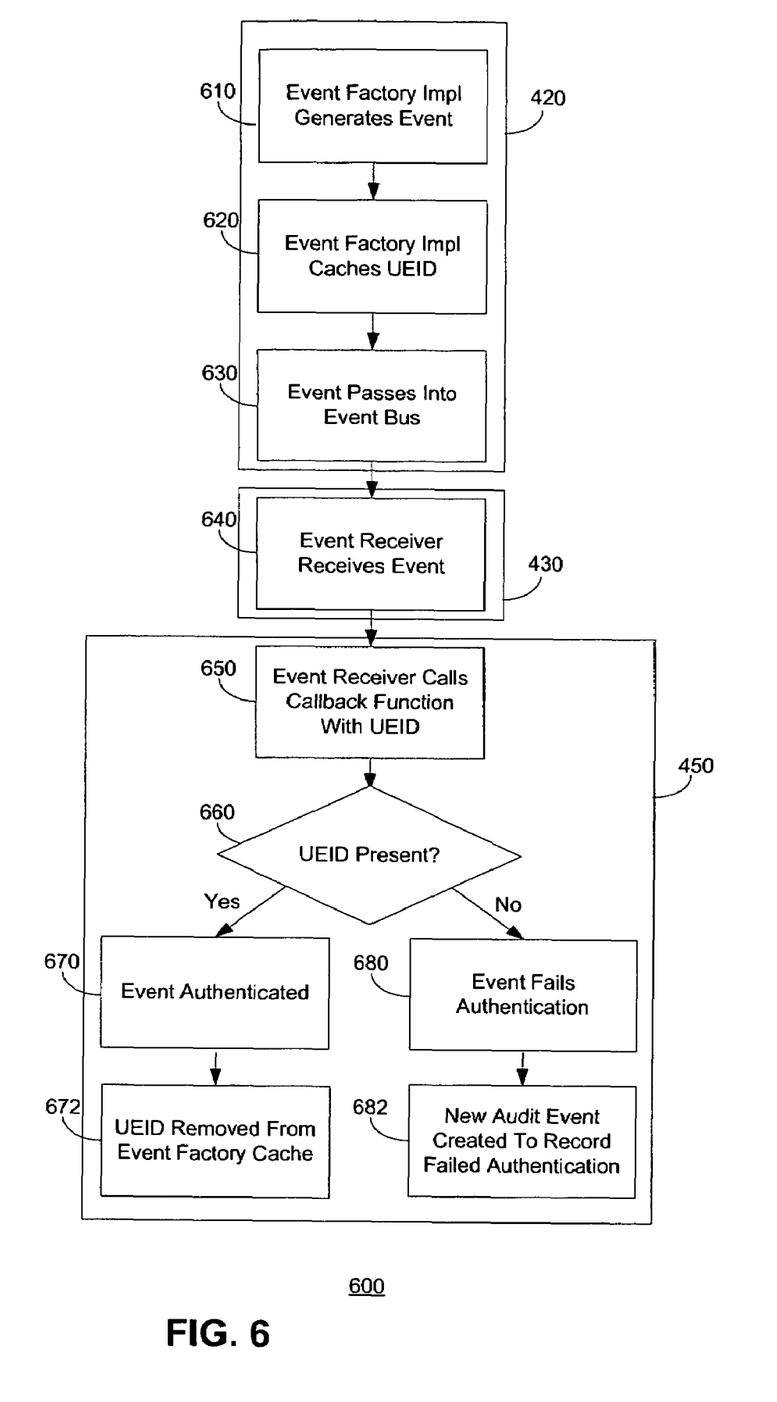
FIG. 6 is a flowchart of yet another embodiment of a method for generating trusted audit event records in accordance with the present invention.

FIG. 6, in which like elements share like reference numbers with FIG. 4, is a flowchart of yet another embodiment of a method for generating trusted audit event records in accordance with the present invention. Method 600 includes an event factory implementation generating an event at 610, the event factory implementation caching the UEID for the event at 620, the event passing into the event bus at 630, an event receiver receiving the event at 640, the event receiver calling a callback function with a UEID at 650, and the event factory implementation checking that the UEID is present at 650. The method 600 may continue along different paths depending on whether the UEID is present.

The method 600 begins at 610 with the event factory implementation generating an event. The registration of the event factory implementation, registration of an event factory implementation identifier, and other steps may already have taken place. In one embodiment, the registration is limited to registration by an authorized administrative user. In one embodiment, the event receiver is registered and associated with the event factory implementation based on the registering. In another embodiment, an application is registered and associated with the event factory implementation based on the registering. The event may be generated by the application. In one embodiment, the generating the event may include filtering the event to determine suitability of continuing generation of the event, authenticating the event, passing the event to an event bus, or the like. In one embodiment, the event may be modified for additional security by encrypting at least a portion of the event, signing the event, providing credential data, or the like.

At 620, the event factory implementation caches the event UEID as an event identifier when a registered event factory implementation generates an event. In one embodiment, the event includes the event factory implementation identifier and the UEID. The event then passes into the event bus at 630. An event receiver then receives the event at 640.

At 650, the event receiver calls a callback function with the UEID as an argument. In one embodiment, the callback function is associated with the event factory implementation and identified from the event factory implementation identifier. At 660, the associated event factory implementation determines whether the UEID is present by checking the cache of the UEIDs the associated event factory implementation has generated, and validates event authenticity based on the presence of the UEID passed as an argument to the callback function.

When the UEID is present in the cache, the event factory implementation generated the event, and so the event is authenticated at 670. In one embodiment, the UEID is removed from the cache after the authentication is processed at 672, i.e., when the authenticity of the event has been validated, in order to ensure that the event is only processed once. In another embodiment, the event is processed once per event receiver. Those skilled in the art will appreciate that each event receiver may be registered with the event infrastructure with a unique event receiver identifier associated with the event receiver, may satisfy any authorization required for the registration, and may pass its unique event receiver identifier along with the event identifier when invoking the registered callback function. The unique event receiver identifier may be used with the event identifier in validating event authenticity. In one embodiment, the event factory implementation maintains a permanent cache of generated events. In another embodiment, an event factory implementation has a limited internal cache size, so that the UEIDs may remain in the internal cache for a predetermined time or until the maximum cache size is reached. In one embodiment, a First In First Out (FIFO) policy is applied to UEIDs in order to determine which unauthenticated UEIDs are to be removed when the maximum cache size is reached.

When the UEID is not present when an event factory implementation receives a callback function request, the event authentication may fail at 680. In one embodiment, a failed event authentication is an auditable event, and a new event may be created to record the failed authentication 682.

As an alternative to the event receiver checking event authenticity, the authenticity of events may be checked at various other stages as an event passes through the event infrastructure. The audit service may provide access to the callback function for any application or code running on the server. In one embodiment, access to the callback function is limited to registered and/or trusted code. In one example, the audit service may receive the event at 430 after an event factory has generated the event at 420, identify the appropriate callback function at 440, and execute the callback function at 450. In another example, the event bus may receive the event at 430 after an event factory has generated the event at 420, identify the appropriate callback function at 440, and execute the callback function at 450. In another example, the event bus may perform authenticity checking when an event is being retrieved. Audit service, event bus, and other authenticity checking may be performed alternative to or in addition to authenticity checking at the event receiver.

Figure 7:
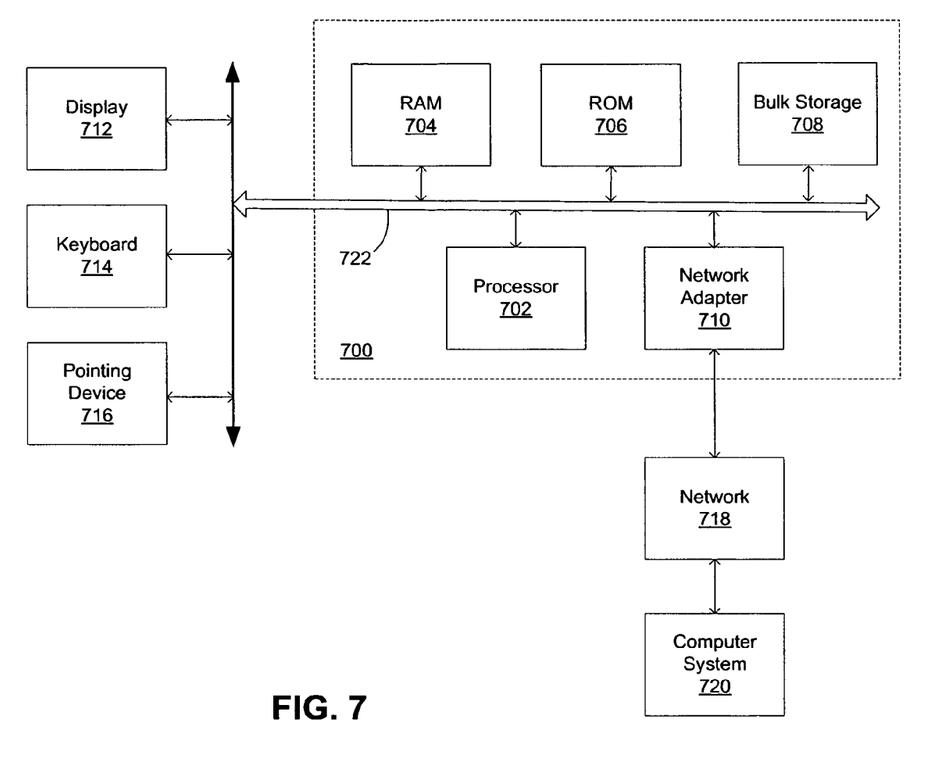
FIG. 7 is a block diagram of a computer system suitable for implementing trusted application event auditing in accordance with the present invention.

FIG. 7 is a block diagram of a computer system suitable for implementing trusted application event auditing in accordance with the present invention. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A computer system 700 suitable for storing and/or executing program code will include at least one processor 702 coupled directly or indirectly to memory elements through a system bus. The memory elements can include local memory employed during actual execution of the program code, such as random access memory (RAM) 704 and/or read only memory (ROM) 706; bulk storage 708, and cache memories (not shown) which provide temporary storage of at least some program code in order to reduce the number of times code must be retrieved from bulk storage during execution.

Input/output (I/O) devices, such as displays 712, keyboards 714, pointing devices 716, or the like, can be coupled to the system either directly or through intervening I/O controllers.

Network adapters 710 may also be coupled to the computer system 700 to enable the computer system 700 to become coupled to other computer systems 720 or remote printers or storage devices through intervening private or public networks 718. In one embodiment, the network 718 may be an event bus 120. Modems, cable modem and Ethernet cards are just a few of the currently available types of network adapters.

Those skilled in the art will appreciate that the hardware depicted in FIG. 7 may vary depending on the particular use desired. The example depicted is not meant to imply architectural imitations with respect to the present invention.

While the embodiments of the present invention disclosed herein are presently considered to be preferred embodiments, various changes and modifications can be made without departing from the spirit and scope of the present invention. For example, the disclosed method allows for the signing and encrypting of events. A specific implementation may choose to use cryptography techniques for better authenticity and confidentiality quality of protection. A key management infrastructure may be used to support signing and encrypting events. Access control policy may be specified so that only authorized applications can use event factory to generate events. Similarly, access control policy may be specified so that event receivers only accept events from authorized applications. A digital processing apparatus executing a computer program stored on a computer readable medium may perform the operations described herein. The scope of the invention is indicated in the appended claims, and all changes that come within the meaning and range of equivalents are intended to be embraced therein.

I claim:

1. A method in a data processing system for trusted application event auditing, the method comprising:

registering a callback function with an audit service, wherein the callback function is trusted code associated with a first callback function identifier;

registering an event receiver, and associating the event receiver with the callback function;

registering a second callback function identifier with the audit service;

associating the second callback function identifier with the callback function;

providing the second callback function identifier from a trusted application to the event receiver in response to seeking validation of the trusted application;

receiving an event having the second callback function identifier at the event receiver, wherein the received event comprises an event identifier;

calling the audit service with the second callback function identifier being included as an argument of the callback function;

identifying the callback function based on matching the second callback function identifier to the first callback function identifier;

calling the callback function to validate authenticity of the event, wherein the calling comprises calling the callback function using the event identifier; and removing the second callback function identifier from registration in the audit service in response to the second callback function identifier being included as the argument of the callback function.

2. The method of claim 1, further comprising:
registering an application and associating the application with the callback function.

3. The method of claim 1, wherein the callback function validates authenticity of the event as being from the trusted application; and
wherein the callback function is sent from the event receiver in response to the matching of the second callback function identifier to the first callback function identifier, the callback function including the second callback function identifier as an argument.

4. The method of claim 1, wherein the identifying of the callback function is performed by the event receiver; and
wherein the calling of the callback function is performed by the event receiver.

5. The method of claim 1, further comprising:
failing event authentication in response to the second callback function identifier not matching the first callback function identifier.

6. A software product comprising a program of instructions stored on a machine readable storage medium for trusted application event auditing, wherein the program of instructions upon being executed in a data processing system causes the data processing system to perform activities comprising:
registering a callback function with an audit service, wherein the callback function is trusted code associated with a first callback function identifier;
registering an event receiver, and associating the event receiver with the callback function;
registering a second callback function identifier with the audit service;
associating the second callback function identifier with the callback function;
providing the second callback function identifier from a trusted application to the event receiver in response to seeking validation of the trusted application;
receiving an event having the second callback function identifier at the event receiver, wherein the received event comprises an event identifier;
calling the audit service with the second callback function identifier being included as an argument of the callback function;
identifying the callback function based on matching the second callback function identifier to the first callback function identifier;
calling the callback function to validate authenticity of the event, wherein the calling comprises calling the callback function using the event identifier; and
removing the second callback function identifier from registration in the audit service in response to the second callback function identifier being included as the argument of the callback function.

7. The software product of claim 6, further comprising:
registering an application and associating the application with the callback function.

8. The software product of claim 6, wherein the callback function validates authenticity of the event as being from the trusted application; and
wherein the callback function is sent from the event receiver in response to the matching of the second callback function identifier to the first callback function identifier, the callback function including the second callback function identifier as an argument.

9. The software product of claim 6, wherein the identifying of the callback function is performed by the event receiver; and
wherein the calling of the callback function is performed by the event receiver.

10. The software product of claim 6, further comprising:
failing event authentication in response to the second callback function identifier not matching the first callback function identifier.

11. A data processing system configured for trusted application event auditing, comprising:
a memory configured to store registration with an audit service of a callback function, wherein the callback function is trusted code associated with a first callback function identifier;
an event receiver configured to receive an event having a second callback function identifier, wherein the received event comprises an event identifier, wherein a second callback function identifier is registered with said audit service and is associated with the callback function;
means for providing the second callback function identifier from a trusted application to the event receiver in response to seeking validation of the trusted application;
means for calling the audit service with the second callback function identifier being included as an argument of the callback function;
a processor connected to said memory and configured to perform instructions for identifying the callback function based on matching the second callback function identifier to the first callback function identifier; and
a bus connected to said processor and said event receiver, said bus being configured to communicated a call from the event receiver calling the callback function to validate authenticity of the event, wherein the calling comprises calling the callback function using the event identifier;
wherein said memory further being configured to store registration of an event receiver associated with the callback function; and
wherein the second callback function identifier is removed from registration in the audit service in response to the second callback function identifier being included as the argument of the callback function.

12. The data processing system of claim 11, wherein said memory is further configured to store registration of an application associated with the callback function.

13. The data processing system of claim 11, wherein the callback function validates authenticity of the event as being from the trusted application; and
wherein the callback function is sent from the event receiver in response to the matching of the second callback function identifier to the first callback function identifier, the callback function including the second callback function identifier as an argument.

14. The data processing system of claim 11, wherein the identifying of the callback function is performed by the event receiver; and
wherein the calling of the callback function is performed by the event receiver.

15. The data processing system of claim 11, wherein the processor is further configured to fail event authentication in response to the second callback function identifier not matching the first callback function identifier.

* * * * *

UNITED STATES PATENT AND TRADEMARK OFFICE
CERTIFICATE OF CORRECTION

PATENT NO.        : 7,661,111 B2
APPLICATION NO.   : 11/249931
DATED             : February 9, 2010
INVENTOR(S)       : Ching-Yun Chao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1154 days.

Signed and Sealed this

Thirtieth Day of November, 2010

David J. Kappos
*Director of the United States Patent and Trademark Office*